United States Patent [19]

Sosa et al.

[11] Patent Number: 4,857,587
[45] Date of Patent: Aug. 15, 1989

[54] CONTINUOUS PROCESS INCLUDING RECYCLE STREAM TREATMENT FOR THE PRODUCTION OF HIGH IMPACT POLYSTYRENE

[75] Inventors: Jose M. Sosa, Big Spring; Jeffrey Morris, Roanoke, both of Tex.

[73] Assignee: Fina Technology, Inc., Dallas, Tex.

[21] Appl. No.: 137,743

[22] Filed: Dec. 24, 1987

[51] Int. Cl.⁴ .......................... C08L 51/04; C08F 2/00
[52] U.S. Cl. ........................................ 525/53; 525/54; 526/67; 526/68; 526/65
[58] Field of Search ................... 525/54, 53; 526/67, 526/68

[56] References Cited

U.S. PATENT DOCUMENTS

| 3,243,481 | 3/1966 | Ruffing et al. |
| 3,311,675 | 3/1967 | Doak et al. ......................... 525/54 |
| 3,658,946 | 4/1972 | Bronstert et al. |
| 3,903,202 | 9/1975 | Carter et al. |
| 4,035,445 | 7/1977 | Baumgartner ....................... 525/54 |
| 4,212,789 | 7/1980 | Anspon . |
| 4,250,270 | 2/1981 | Farrar ................................. 525/54 |
| 4,451,612 | 5/1984 | Wang et al. |
| 4,567,232 | 1/1986 | Echte et al. |

FOREIGN PATENT DOCUMENTS 4958194 10/1972 Japan .

Primary Examiner—Wilbert J. Briggs, Sr.
Attorney, Agent, or Firm—M. Norwood Cheairs; Michael J. Caddell; William Berridge

[57] ABSTRACT

A continuous flow process for the production of high impact polystyrene, wherein specific types of polymerization inhibiting impurities are removed from a recycle stream prior to feeding or introducing the recycle stream into a styrene polymerization zone. Preferably, the process further comprises the step of monitoring the acidity of the recycle stream.

10 Claims, 3 Drawing Sheets

CONTINUOUS PROCESS INCLUDING RECYCLE STREAM TREATMENT FOR THE PRODUCTION OF HIGH IMPACT POLYSTYRENE

FIELD OF THE INVENTION

The present invention relates to a process for producing high impact polystyrene. More particularly, the invention relates to a continuous flow process for producing polystyrene having discrete particles of rubber included therein.

BACKGROUND OF THE INVENTION

It is well known that rubber-reinforced polymers of monovinylidene aromatic compounds, such as styrene, alpha-methylstyrene and ring-substituted styrene, are useful for a variety of purposes. For example, rubber-reinforced styrene polymers having discrete particles of a cross-linked rubber, e.g., polybutadiene, dispersed throughout the styrene polymer matrix can be used in a variety of diverse applications including refrigerator linings, packaging applications, furniture, household appliances and toys. Such rubber-reinforced polymers are commonly referred to as "high impact polystyrene" or "HIPS".

One known process for producing HIPS polymers is the batch or suspension process wherein polymerization occurs within a single reaction vessel. An advantage of the batch process is the ease with which HIPS production can be controlled and monitored due to the use of a single reaction vessel throughout the entire polymerization process. However, the batch process suffers from a number of inherent disadvantages, such as low yields and extended down-time periods, which render it unsuitable for commercial purposes.

In order to overcome the commercial difficulties of the batch process, several continuous flow processes for the production of HIPS have been proposed. Such known processes employ a plurality of serially arranged reaction vessels wherein the degree of polymerization from one vessel to the next. See, for example, U.S. Pat. No. 3,658,946 to Bronstert et al., U.S. Pat. No. 3,243,481 to Ruffing et al., U. S. Pat. No. 4,451,612 to Wang et al. and U.S. Pat. No. 4,567,232 to Echte et al.

Several of these continuous process patents generally suggest that some type of devolatilization zone and recycle pathway be used for returning solvents and unreacted monomer to one of the polymerization reaction zones. However, the recycle stream leaving the devolatilization zone contains a substantial amount of impurities, which can adversely affect the continuous HIPS production process when the impurities are introduced into a polymerization zone. In fact, these impurities can destroy the effectiveness of a free radical initiator and inhibit polymerization for a significant period of time, even indefinitely, when the recycle stream is fed into the initial polymerization reacton zone. Further, such impurities can impart undesirable physical characteristics, such as discoloration, to the HIPS polymers.

None of the above patents recognizes either the cause or the effects of recycle stream impurities. Similarly, none of those patents provides any means for overcoming the adverse effects of these impurities upon a continuous flow process for producing HIPS polymers.

SUMMARY OF THE INVENTION

The present invention overcomes the disadvantages of known continuous HIPS production processes. In particular, the present invention provides a continuous flow process wherein specific types of polymerization inhibiting impurities are removed from a recycle stream prior to feeding or introducing the recycle stream into a polymerization zone. In a preferred embodiment, the inventive process further comprises the step of monitoring the acidity of the recycle stream.

BRIEF DESCRIPTION OF THE DRAWINGS

Other objects and further features of the present invention will be better understood when considered in conjunction with the accompanying drawings, wherein like numerals denote corresponding parts, and wherein:

FIG. 2 is a schematic representation of another embodiment of reaction vessels and apparatus useful in the process of the present invention.

DETAILED DESCRIPTION OF THE INVENTION

Figure 1:
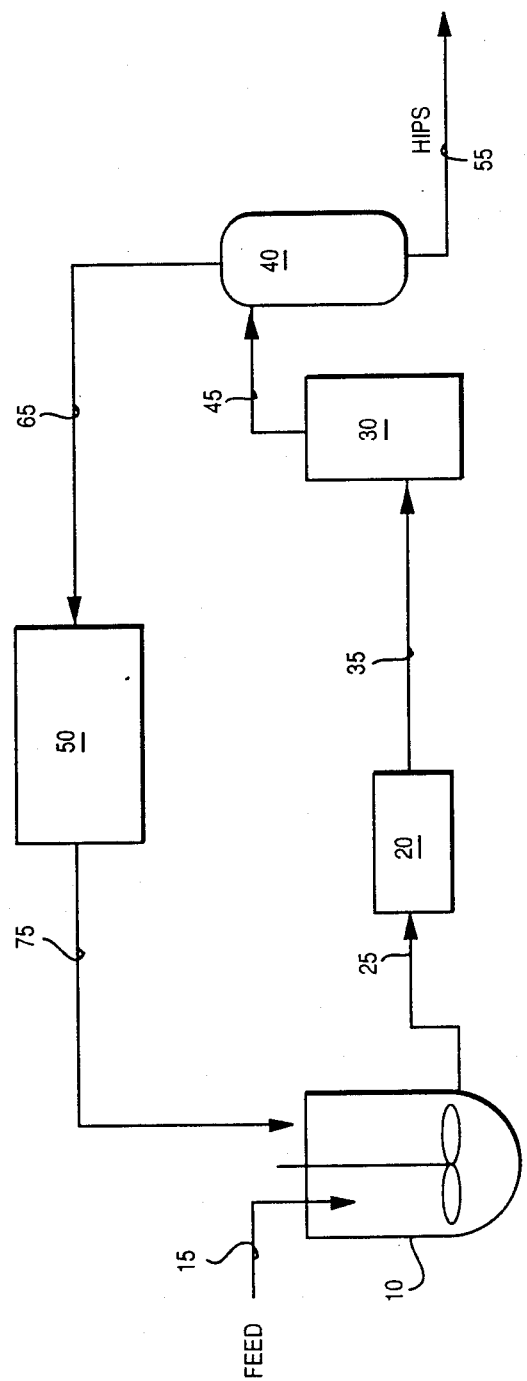
FIG. 1 is a schematic representation of reaction vessels and apparatus useful in the process of the present invention.

Referring now to FIGS. 1 and 2, there is shown a schematic representation of a series of reaction vessels and apparatus useful in the practice of the continuous HIPS production process of the present invention.

Styrene, polybutadiene, a free radical initiator and additional components such as solvents, antioxidants, and other additives are fed to a polymerization reactor 10 through a feed line or lines generally indicated at 15. As used herein, the term "styrene" includes a variety of substituted styrenes, e.g. alpha-methyl styrene, ring-substituted styrenes such as p-methylstyrene and p-chlorostyrene, as well as unsubstituted styrene. Typically, the mixture in polymerization reactor 10 will comprise about 75 to 99% by weight styrene, about 1 to 15% by weight polybutadiene, about 0.001 to 0.2% by weight free radical initiator, and about 0.1 to about 6% by weight of additional components.

Polymerization reactor 10 is preferably a continuously stirred tank reactor which operates at a percent solids level above the inversion of the polymer system. That is, the polymerization reactor 10 operates at a percent solids level such that the system has a continuous phase of polystyrene and a discontinuous phase of dispersed droplets of rubber, or preferably, the droplets are a mixture of polystyrene and rubber.

Preferably, the apparatus used in practicing the present invention further comprises an additional polymerization reactor 11 which is operated at pre-inversion conditions, i.e. the continuous phase therein is a styrene-rubber solution and the discontinuous phase is polystyrene. This pre-inversion reactor 11 is located directly before the polymerization reactor 10, such that the styrene, polybutadiene, free radical initiator and other components are fed to the pre-inversion reactor 11 and the mixture exiting the pre-inversion reactor is then fed to polymerization reactor 10. The pre-inversion reactor is preferably a continuous stirred tank reactor.

Output from the polymerization reactor 10 is fed to another polymerization reactor through line 25 and post-inversion stage polymerization occurs in this next polymerization reactor. Preferably, this next polymerization reactor is a linear-flow reactor, such as plug flow reactor, but may also be a tower-type reactor or other known reactor. FIG. 1 shows a single linear-flow reactor 20; FIG. 2 shows two linear-flow reactors 21 and 22; and more linear-flow reactors may be serially connected with increased polymerization occurring in each subsequent reactor. Output from polymrization reactor(s) 20 (21, 22) is directed to a pre-heater 30 and then to a conventional devolatilizer 40, through lines 35 and 45 respectively. The resultant HIPS polymer is removed from devolatilizer 40 through line 55 and directed to a conventional pelletizer (not shown) or the like. The HIPS polymer thus produced has a notched Izod value of 1.9 to 3.0 ft/lb, a Gardner falling dart value of 80 to 160 in/lb, and a tensile strength of 2600 to 4500 psi. These HIPS polymers have excellent color and gloss and are suitable for many applications.

Unreacted styrene monomer and other volatile residual components leave devolatilizer 40 through line 65 as a recycle stream. It is preferably returned to the system after condensation in condenser means 66, storage and treatment in tank 67 and treatment in recycle treatment means 50, at the polymerization reactor 10 through line 75, as shown in FIG. 1. As shown in FIG. 2, besides being returned to the system at polymerization reactor 10 through line 77, it may alternatively be returned to the system at pre-inversion reactor 11 or at linear-flow reactor 21 through line 76 or 78, respectively. The recycle stream contains a variety of impurities. The major impurities in the recycle stream can be traced to products of reactions between species necessarily present in the recycle stream, such as styrene monomer and antioxidant, and impurities from the rubber, and unwanted species in the systems, such as oxygen. Although some of the recycle stream impurities are innocuous, it has been unexpectedly discovered that certain impurities in the recycle stream adversely affect the polymerization process or the resultant HIPS product when the recycle stream is introduced into the system.

In the continuous process of the present invention, polymerization of the styrene monomer is initiated by the decomposition of a free radical initiator. Initiating radicals for the polymerization reaction are generated by the decomposition of the free radical initiator into one or more primary radicals. The primary radical than reacts with styrene monomer to initiate polymerization.

Typically, the free radical initiator is fed to the first polymerization reactor 10, which is maintained at conditions under which the free radical initiator decomposes, although it may also be fed to pre-inversion reactor 11 or linear-flow reactor 21. The free radical initiator may alternatively be selected such that it will not decompose in the first polymerization reactor 10 and instead will decompose under the conditions maintained in a subsequent polymerization reactor. In this case, polymerization of styrene monomer in polymerization reactor 10 could be thermally initiated. Alternatively, a combination of two or more free radical initiators could be used, such that one free radical initiator decomposes in the polymerization reactor 10 and another free radical intiator decomposes in the linear-flow reactor 20 (21, 22).

Decomposition of the free radical initiator, which initiates polymerization of the styrene monomer, also produces decomposition by-products which do not participate in the polymerization reaction. In the present continuous flow process, these decomposition by-products of the free radical initiator are removed from the HIPS polymer in the devolatilizer 40 and appear in the recycle stream.

After investigating the effects of various recycle stream components upon styrene polymerization, it has been discovered that acid decomposition by-products of free radical initiators react with such initiators, thereby inhibiting styrene polymerization. It is believed that these acidic decomposition by-products adversely affect free radical initiator efficiency by inducing decomposition of the free radical initiator and/or trapping free radicals produced by spontaneous, as opposed to induced, decomposition of the free radical initiator. Thus, the acidic decomposition by-products decrease the number of free radicals available to initiate polymerization of the styrene monomer and decrease the efficiency of the free radical initiator.

Benzoic acid is one example of an acid decomposition by-product having such an adverse effect. The recognization that benzoic acid in the recycle stream inhibits styrene polymerization in the presence of a free radical initiator is particularly significant because benzoic acid is a decomposition by-product of t-butyl peroxybenzoate and dibenzyl peroxide, two of the most commonly used free radical initiators in the continuous process production of HIPS. Benzoic acid is also produced from the air oxidation of benzladehyde, which in turn is produced from the oxidation of styrene. Other acidic species may be present in the polybutadiene rubber. It is well known that phenolic anti-oxidants, sulfur components and substituted phosphites are added to protect the rubber from oxidation.

Examples of acid-producing free radical initiators and their corresponding acid decomposition by-products are set forth in Table 1. Those examples show that peroxy free-radical initiators are a useful class of initiators for such processes, but that acidic decomposition by-products of such peroxy free-radical initiators produce undesirable effects which the present invention is intended to alleviate. Applicants' recognition of such acidic by-products as a source of a problem in the manufacture of HIPS products is a significant threshold aspect of the present invention.

TABLE 1

| | |
|---|---|
| Dilauroyl peroxide | Lauroyl acid |
| Dioctanoyl peroxide | Caprylic acid |
| Didecanoyl peroxide | n-Decanoic acid |
| Di-n-propionyl peroxide | Propionic acid |
| Bis(3,5,5-trimethyl hexanoyl) peroxide | 3,5,5-Trimethyl hexanoic acid |
| Dibenzoyl peroxide | Benzoic acid |
| Bis(2,4-dichlorobenzoyl) peroxide | 2,4 Dichlorobenzoic acid |
| Bis(o-methylbenzoyl) peroxide | o-Methyl benzoic acid |
| Acetyl cyclohexane sulphonyl peroxide | Cyclohexane sulphonic acid |
| t-Butylperoxypivalate | Pivalic acid |
| t-Butyl peroxy-2-ethylhexanoate | 2-Ethyl caproic acid |
| t-Butyl peroxy isobutyrate | Isobutyric acid |
| t-Butyl peroxybenzoate | Benzoic acid |

All of the above-listed acid decomposition by-products are believed to have a detrimental effect on the efficiency of free radical initiation of styrene polymerization.

Figure 3:
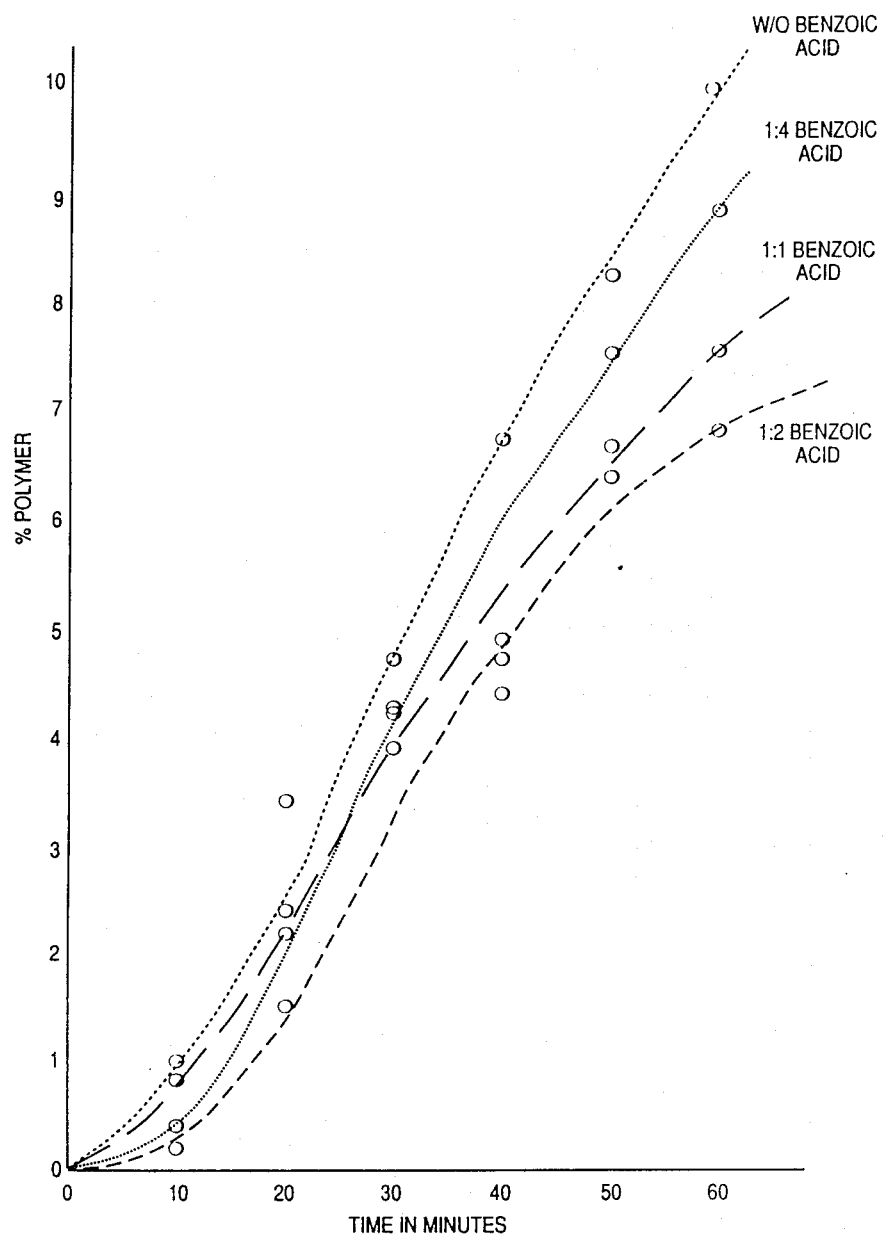
FIG. 3 is a graph showing the effect of benzoic acid on the polymerization of styrene in the presence of a free radical initiator.
Figure 4:
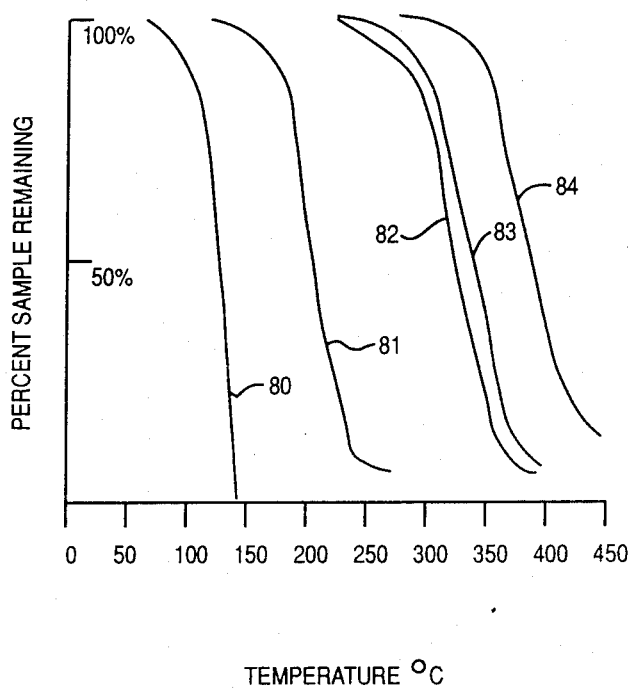

FIG. 3 graphically illustrates the unexpectedly detrimental effects of benzoic acid upon styrene polymerization in the presence of the free radical initiator t-butylperoxybenzoate. This inhibitory effect of benzoic acid in the recycle stream is particularly surprising since benzoic acid is a decomposition by-product of t-butylperoxybenzoate and dibenzoyl peroxide, initiators which have long been widely used in catalyzing styrene polymerization reactions. Table 2 below lists the inhibition time and percent polymerization after specified time intervals at varying ratios of t-butylperoxybenzoate (TBP) to benzoic acid, which is graphically presented in FIG. 3.

TABLE 2

POLYMERIZATION OF STYRENE IN PRESENCE OF TBP AND BENZOIC ACID AT 120° C. UNDER $N_2$

| Ratio of TBP:Acid | % Polymer at (min) | | | | | | | (min) Inhib. Time |
|---|---|---|---|---|---|---|---|---|
| | 0 | 10 | 20 | 30 | 40 | 50 | 60 | |
| 1:0 | 0 | 1.0 | 3.4 | 4.7 | 6.7 | 8.2 | 9.9 | 7.5 |
| 1:1 | 0 | 0.84 | 2.4 | 3.9 | 4.9 | 6.6 | 7.5 | 7.0 |
| 1:2 | 0 | 0.21 | 2.0 | 3.8 | 5.0 | 6.4 | 6.8 | 13.0 |
| 1:4 | 0 | 0.42 | 2.2 | 4.2 | 4.4 | 7.5 | 8.8 | 11.0 |

As clearly indicated in Table 2 and FIG. 3, the polymerization inhibition time at TBP:Acid ratios of 1:1 and 1:0 is significantly less than at ratios of 1:2 anrd 1:4. Initially, the benzoic acid apparently contributes to an inhibition process (see the amount of polymer formed after 10 minutes). After the inhibition of retardation effect is overcome, the polymerization reaction proceeds normally. However, in a system with continuous recycle, he inhibitory effect would constantly be present as fresh recycle stream is continuously fed to the polymerization reactor.

A reduction in inhibition time has a marked effect upon the overall continuous HIPS production process. A reduction in inhibition time advantageously results in increased free radical initiator efficiency, decreased residence time in the initial polymerization zone and an increased product rate without the necessity of providing additional equipment.

According to the process of the present invention, the adverse effects of acid decomposition by-products of free radical initiators, such as t-butylperoxybenzoate, dibenzoyl-peroxide and the free radical initiators listed in Table 1, are avoided by directing the recycel stream to a recycle treatment vessel 50 interposed between devolatilizer 40 and recycle stream feed line 75. Recycle treatment vessel 50 comprises at least one adsorbent material, such as alumina or clay, which is capable of removing acid components from the recycle stream. Examples of specific adsorbent materials include alumina, attapulgus clay, carbon, silica gels and Porocel (TM—an alumina). The size and shape of the recycle treatment vessel are determined according to standard engineering practices. Preferred is a clay tower, maintained at 80°–120° and 20-25 psi pressure.

While the recycle treatment vessel must be capable of removing substantially all of the acid components from the recyclee stream, it is highly desirable that the adsorbent used also be capable of removing other impurities, both identified and unknown, from the recycle stream. The combined effects of all impurities, including acid decomposition by-products, upon styrene polymerization reaction rate and the average rubber particle size in the resultant HIPS polymer are significantly detrimental, and increasee with an increase of the amount of impurities.

According to a preferred embodiment of the present invention, the continuous process for the production of HIPS further includes the step of monitoring the acidity and/or purity of the treated recycle stream prior to feeding the treated recycle stream back into the polymerization system. The acidity of the treated recycle stream should be monitored to ensure that the recycle treatment vessel is effectively eliminating acid components from the recycle stream. The acidity of the treated recycle stream is considered adequately controlled when the treated recycle stream contains less than 0.08% acid components. Preferably, the treated recycle stream contains less than 0.03% acid components, and most preferably less than 0.01%. The recycle treatment vessel should be readjusted after a period of use, either regularly or based on results of monitoring recycle stream purity. For instance, clay adsorbent in a clay tower should be replaced when recycle stream purity diminishes.

Several means for monitoring the acidity and/or purity of the treated recycle stream can be used in accordance with the presently claimed invention. Three preferred monitoring procedures are: a water wash pH test, a recycle purity test and a total acid number test.

The water wash pH test comprises the step of pouring equal amounts of distilled or deionized water and a sample of the treated recycle into a separatory funnel; shaking the separatory funnel for at least 15 seconds; allowing the phases in the separatory funnel to separate for about five minutes, draining the lower water layer from the separatory funnel into a beaker; and then determining the pH of the water ring using a conventional pH meter. If the pH of the water is less than 6.5, the treated recycle stream has an unacceptably high acid content and the adsorbent in the recycle stream vesel should be replaced to ensure that the treated recycle stream does not have any adverse effects upon the polymerization of styrene in the polymerization system. Preferably, the pH of the water should be 6.8 to 7.0.

The recycle purity test detects the presence of phenolic compounds which react with peroxides to give colored compounds that are potent inhibitors. It is conducted as follows. A clay treated styrene is prepared by filling a separatory funnel with clay, filling the funnel with styrene, allowing the styrene and clay to stand for about five minutes, draining the separatory funnel slowy, and filtering the styrene to remove clay fines. To conduct the recycle purity test, a blank containing about 40 ml of clay treated styrene and four drops of t-butylperoxy-benzoate and a sample containing 40 ml of the treated recycle stream and four drops of t-butylperoxybenzoate are prepared. The blank and the sample are heated in an oven at a temperature of 130°–135° C. for about ten minutes. The blank and the sample are visually inspected to determine the presence or absence of a yellow color. Next, the percent transmittance of the sample is determined using a spectrophotometer. The wave length of the spectrophotometer is set to 400 nm and 0% transmittance without a cell in the instrument. The blank is inserted into the spectrophotometer and the transmittance is set to 100%. Next, the sample is inserted into the spectrophotometer and the percent transmittance of the sample is determined. A clean treated recycle stream will be water-white, i.e., no evidence of yellow color, and the percent transmittance will be greater than 95%.

The most preferred method for monitoring the acid content of the treated recycle stream is the total acid number test. The total acid number test is adapted from ASTM D 974-80 and comprises the following steps. A titration solvent is prepared by adding 500 ml of toluene and 5 ml of deionized water to 495 ml of anhydrous isopropyl alcohol. A p-naphtholbenzein indicator solution is prepared by dissolving 1.0 gram of p-naphtholbenzein in 100 ml of tthe titration solvent. To perform the sample titration, about 20 grams of the treated recycle stream, 100 ml of the titration solvent and 10 drops of the indicator solution are introduced as a sample solution into a suitable container such as a flask. This sample solution is swirled, without stoppering, until the sample is entirely dissolved by the solvent. The sample solution is then titrated immediately at a temperature below 30° C. by adding 0.01N alcoholic KOH solution in increments and swirling to disperse the KOH as necessary. The titration is continued until the orange color of the sample solution changes to a green or green-brown color. The end point of the titration is considered definite if the color change persists for 15 seconds. The quantity of 0.01N alcohol KOH required to reach the end point is recorded. A blank titration on 100 ml of the titration solvent and 10 drops of the indicator solution is performed by incrementally adding 0.01N alcoholic KOH solution until the orange to green or green-brown color change occurs, indicating the end point. The quantity of 0.01N alcoholic KOH required to reach the end point of the blank titration is recorded. The total acid number (T), expressed as mg of KOH/g, of the treated recycle stream, is calculated by the formula: $T=((A-B)N \times 56.1)/W$, wherein A is the number of ml of KOH solution required for titration of the sample solution, B is the number of ml of KOH solution required for titration of the blank, N is the normality of the KOH solution, and W is the weight of the sample used. The treated recyckle stream is considered to be clean or to have a sufficiently low acid content if the total acid number is 0.08 or lower. Preferably, the total acid number should be less than 0.03, more preferably less than 0.01.

Although the invention has been described with reference to particular embodiments thereof, it will be apparent to those skilled in the art that various changes and modifications can be made without departing from the spirit of the invention or from the scope of the appended claims.

What is claimed is:

1. In a continuous process for producing high impact polystyrene, said process having a volatilized recycle stream with at least 0.08% by weight of acid component by-products of at least one free radical initiator, the improvement comprising:

polymerizing a mixture of at least one vinylaromatic monomer and a rubber in the presence of a free radical initiator in at least one polymerization reactor;

feeding said mixture to a pre-heater to heat said mixture, thereby producing a heated mixture;

feeding said heated mixture to a devolatilizer to eliminate volatile components from said heated mixture, thereby producing a high impact polystyrene polymer;

feeding said volatile components as a recycle stream to a recycle treatment vessel;

removing initiator inhibiting impurities from said recycle stream in said recycle treatment vessel to produce a treated recycle stream containing less than 0.08% by weight of acid component by-products of said free radical initiator; and feeding said treated recycle stream to said polymerization reactor.

2. A process of claim 1, further comprising montoring an acid content of said treated recycle stream.

3. A process of claim 2, wherein the acid content of the treated recycle stream is monitored by an acid number test.

4. A process of claim 3, wherein said recycle stream is maintained with an acid number less than about 0.08.

5. A process of claim 3, wherein said recycle stream is maintained with an acid number less than about 0.03.

6. A process of claim 3, wherein said recycle stream is maintained with an acid number less than about 0.01.

7. A process of claim 1, wherein said recycle stream contains less than 0.03% of said acid component by-products.

8. A process of claim 1, wherein said recycle stream contains less than 0.01% of said acid component by-products.

9. A continuous process for producing high impact polystyrene comprising:

feeding at least one vinylaromatic monomer, a rubber and a free radical initiator to a first continuously stirred tank reactor to form a first mixture therein;

polymerizing said first mixture in said first continuously stirred tank reactor to a point below an inversion point of the first mixture;

feeding said first mixture to a second continuously stirred tank reactor;

polmyerizing said first mixture in said second continuously stirred tank reactor to a point above the inversion point of the first mixture to produce a second mixture;

feeding said second mixture to at least one linear-flow reactor to further polymerize said second mixture and produce a third mixture, wherein a degree of polymerization of said second mixture increases in each said linear-flow reactor;

feeding said third mixture to a pre-heater to heat said third mixture and produce a heated mixture;

feeding said heated mixture to a devolatilizer to remove a recycle stream of volatile components from said heated mixture and thereby produce a high impact polystyrene polymer; wherein said recycle stream, prior to treatment, contains at least 0.08% by weight of acid components;

feeding said recycle stream to a recycle treatment vessel;

removing initiator inhibiting impurities from said recycle stream in said recycle treatment vessel to produce a treated recycle stream containing less than 0.08% by weight acid components; and feeding said treated recycle strea to at least one of said reactors.

10. A process of claim 9, wherein said at least one linear-flow reactor comprises a series of at least two linear-flow reactors.

* * * * *